(12) United States Patent
Reyes et al.

(10) Patent No.: US 6,435,980 B1
(45) Date of Patent: Aug. 20, 2002

(54) FACE COATING FOR A GOLF CLUB HEAD

(75) Inventors: Herbert Reyes, Laguna Niguel; Wayne H. Byrne, Murrieta, both of CA (US)

(73) Assignee: Callaway Golf Company, Carlsbad, CA (US)

( * ) Notice: Subject to any disclaimer, the term of this patent is extended or adjusted under 35 U.S.C. 154(b) by 0 days.

(21) Appl. No.: 09/683,311

(22) Filed: Dec. 12, 2001

Related U.S. Application Data

(63) Continuation-in-part of application No. 09/947,290, filed on Sep. 5, 2001, which is a continuation-in-part of application No. 09/877,652, filed on Jun. 8, 2001, which is a continuation of application No. 09/474,670, filed on Dec. 29, 1999, now Pat. No. 6,248,025, which is a continuation-in-part of application No. 08/958,723, filed on Oct. 23, 1997, now Pat. No. 6,010,411.

(51) Int. Cl.⁷ .............................................. A63B 53/04

(52) U.S. Cl. ...................... 473/324; 473/348; 473/349; 473/345; 428/323

(58) Field of Search ............................... 473/324, 345, 473/347, 348, 349; 427/421, 422; 428/347, 348

(56) References Cited

U.S. PATENT DOCUMENTS

| | | |
|---|---|---|
| 1,658,581 A | 2/1928 | Tobia |
| 1,660,126 A | 2/1928 | Heeter |
| D138,437 S | 5/1944 | Link |
| D138,442 S | 8/1944 | Link |
| D172,459 S | 6/1954 | Beveridge |
| D180,602 S | 7/1957 | Karns |
| 2,934,347 A | 4/1960 | Siniscalchi |
| 2,954,231 A | 9/1960 | MacIntyre |
| 3,989,861 A | 11/1976 | Rasmussen |
| 4,241,115 A | 12/1980 | Temin |
| D265,112 S | 6/1982 | Lyons, Jr. |
| 4,355,808 A | 10/1982 | Jernigan et al. |
| D268,357 S | 3/1983 | Mader |
| 4,398,965 A | 8/1983 | Campau |
| 4,496,153 A | 1/1985 | Kochevar |
| 4,502,687 A | 3/1985 | Kochevar |
| 4,575,447 A | 3/1986 | Hariguchi |
| 4,667,963 A | 5/1987 | Toneyama |
| 4,676,508 A | 6/1987 | Dilny |
| 4,754,974 A | * 7/1988 | Kobayashi |
| 4,778,722 A | 10/1988 | Yamamure et al. |
| 4,793,616 A | 12/1988 | Fernandez |
| 4,809,978 A | 3/1989 | Yamaguchi |
| 4,874,171 A | 10/1989 | Ezaki et al. |
| D309,488 S | 7/1990 | Langert |
| 4,951,953 A | 8/1990 | Kim |
| 5,009,425 A | 4/1991 | Okumoto et al. |
| 5,142,309 A | * 8/1992 | Lee |
| 5,158,289 A | * 10/1992 | Okumoto |
| 5,190,289 A | 3/1993 | Nagai et al. |
| 5,190,290 A | 3/1993 | Take |
| 5,228,964 A | 7/1993 | Okumoto |
| 5,242,168 A | 9/1993 | Aizawa |
| 5,262,118 A | 11/1993 | Fukushima et al. |
| 5,318,296 A | 6/1994 | Adams et al. |
| 5,318,300 A | 6/1994 | Schmidt et al. |
| 5,337,670 A | 8/1994 | Huang |
| 5,350,556 A | 9/1994 | Abe |

(List continued on next page.)

Primary Examiner—Stephen Blau
(74) Attorney, Agent, or Firm—Michael A. Catania

(57) ABSTRACT

A composite golf club head having a club having a striking plate portion with a texture coating is disclosed herein. The golf club head has a crown component composed of a plurality of plies of pre-preg material and a sole component composed of a plurality of plies of pre-preg material. The texture coating is composed of a plurality of polymer resin particles, a medium and a coupling agent. The polymer resin particles are preferably composed of a polyethylene or polypropylene material. The texture coating provides added durability to the composite striking plate portion.

10 Claims, 8 Drawing Sheets

U.S. PATENT DOCUMENTS

| | | |
|---|---|---|
| 5,354,056 A | 10/1994 | Cornish, III |
| 5,354,059 A | 10/1994 | Stuff |
| 5,377,986 A | 1/1995 | Viollaz et al. |
| 5,429,365 A | 7/1995 | McKeighton |
| 5,484,155 A | 1/1996 | Yamawaki et al. |
| 5,485,998 A | 1/1996 | Kobayashi |
| 5,489,098 A | 2/1996 | Gojny et al. |
| D371,817 S | 7/1996 | Olsavsky et al. |
| 5,533,728 A | 7/1996 | Pehoski |
| 5,547,427 A | 8/1996 | Rigal et al. |
| 5,593,356 A | 1/1997 | Takeda |
| D379,391 S | 5/1997 | Moore |
| 5,672,120 A | 9/1997 | Ramirez |
| 5,674,133 A | 10/1997 | Chang |
| 5,743,812 A | 4/1998 | Card |
| D396,512 S | 7/1998 | Besnard et al. |
| 5,779,560 A | 7/1998 | Buck |
| D398,681 S | 9/1998 | Galy |
| D398,682 S | 9/1998 | Moore |
| 5,800,285 A | 9/1998 | Thorne et al. |
| D399,289 S | 10/1998 | Sheets et al. |
| 5,836,830 A | 11/1998 | Onuki et al. |
| 5,851,158 A | 12/1998 | Winrow et al. |
| 5,989,134 A | 11/1999 | Antonious |
| 6,348,011 B1 * | 2/2002 | Reyes |

\* cited by examiner

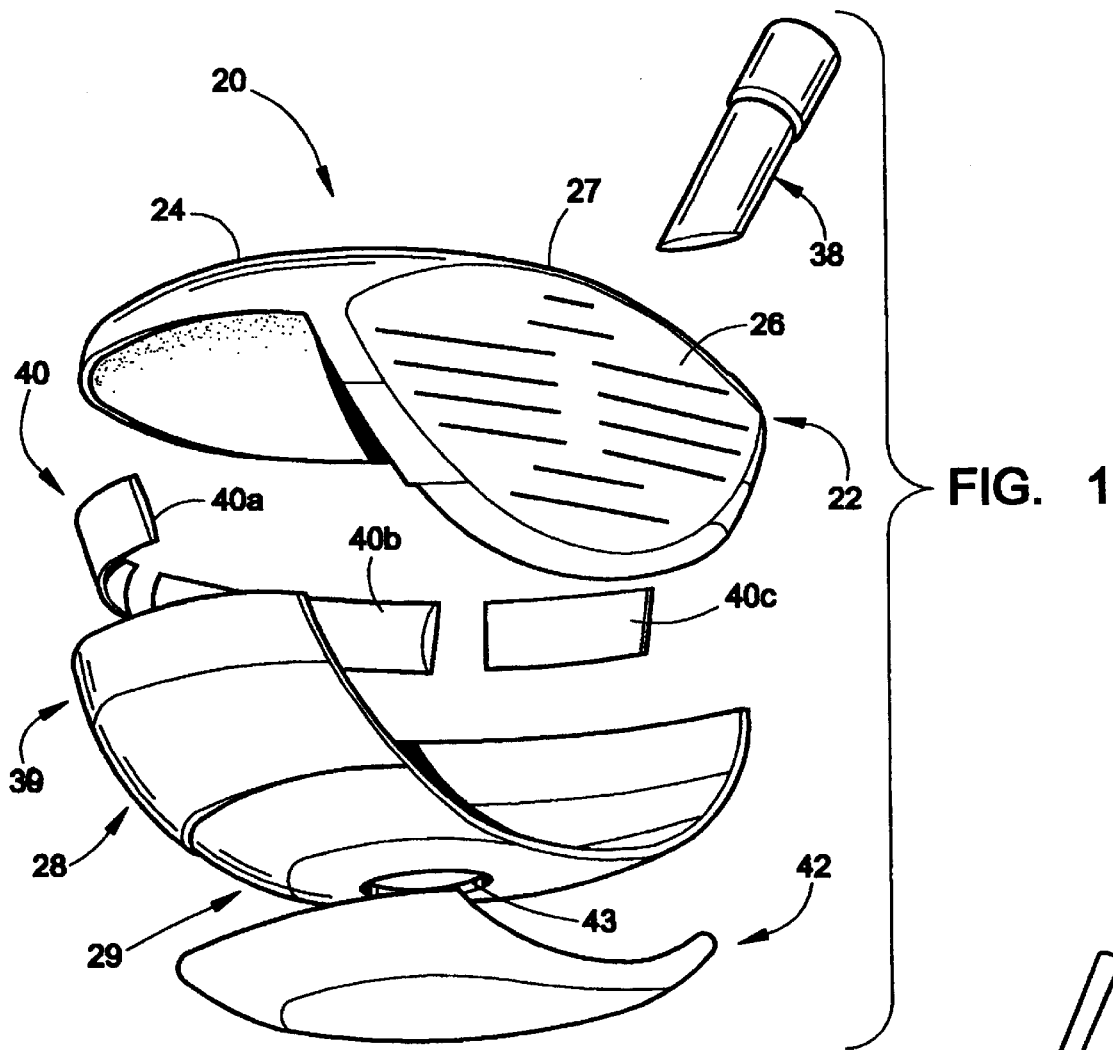
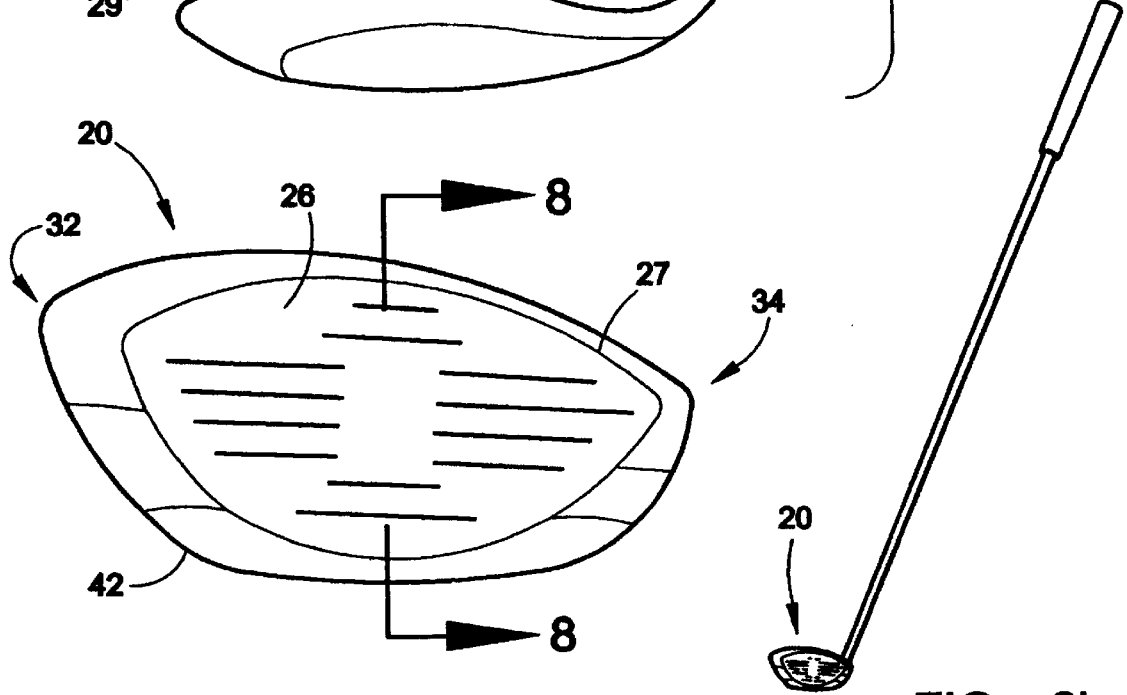
FIG. 1
FIG. 2
FIG. 2b

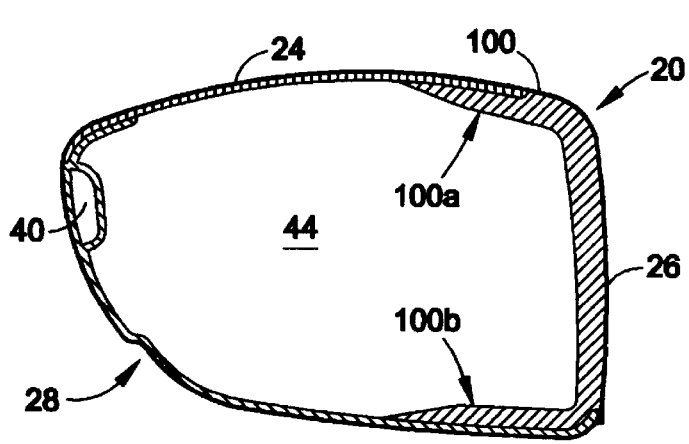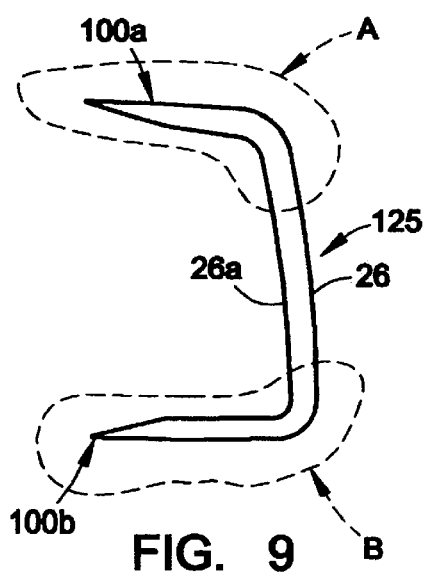
FIG. 8
FIG. 9
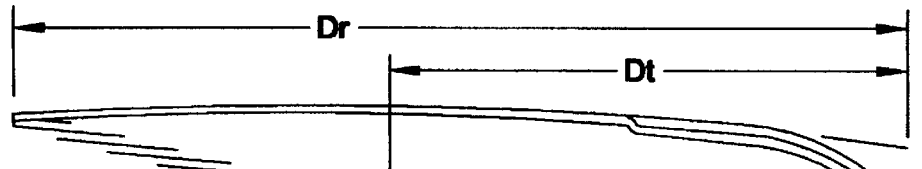
FIG. 9A
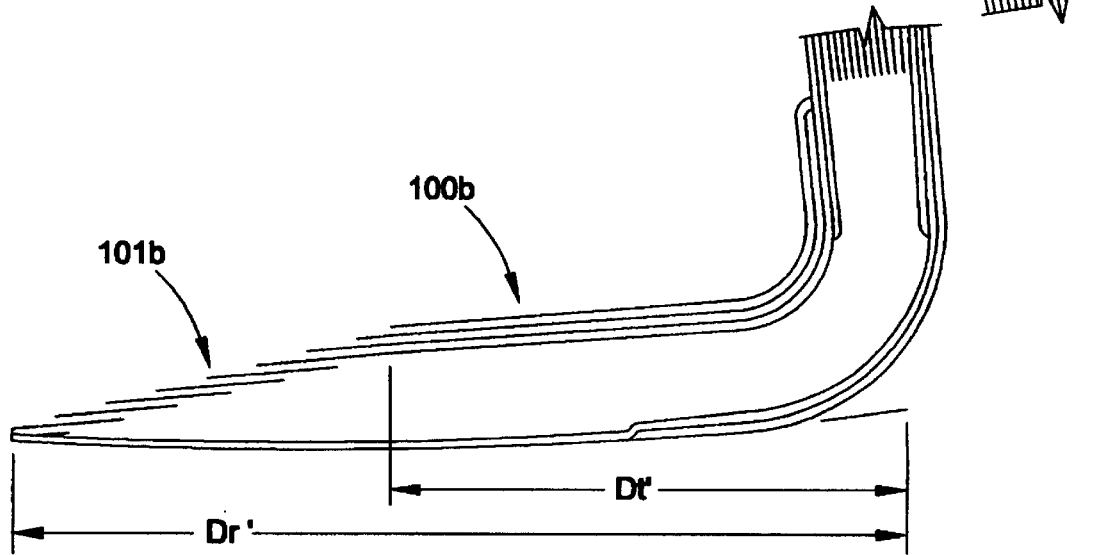
FIG. 9B

FACE COATING FOR A GOLF CLUB HEAD

CROSS REFERENCE TO RELATED APPLICATIONS

This application is a continuation-in-part application of co-pending U.S. patent application Ser. No. 09/947,290, filed on Sep. 5, 2001, which is a continuation-in-part application of co-pending U.S. patent application Ser. No. 09/877,652, filed on Jun. 8, 2001, which is a continuation of U.S. patent application Ser. No. 09/474,670, filed on Dec. 29, 1999, now U.S. Pat. No. 6,248,025, which is continuation-in-part application of U.S. patent application Ser. No. 08/958,723, filed on Oct. 23, 1997, now U.S. Pat. No. 6,010,411.

Federal Research Statement

[Not Applicable]

Background of Invention

1. Field of the Invention

The present invention relates to a face coating for a golf club head. More specifically, the present invention relates to a face coating for a golf club head composed of plies of pre-preg material.

2. Description of the Related Art

One of the first (if not the first) disclosures of a golf club head composed of a plurality of plies of a pre-preg material is Great Britain Patent Application No. 1201648 which was filed in 1967 on behalf of William Charles Carlton. In 1984, U.S. Pat. No. 4,449,707 issued to Hayashi et al., for a Golf Club Head Of Carbon Fiber Reinforced Plastic, based on a Japanese Patent Application originally filed in 1982. The Hayashi Patent discloses surrounding a core with a fiber reinforced fabric to create a golf club head with a proper center of gravity. Another disclosure is U.S. Pat. No. 4,545,580 to Tomita et al., for a Wood-Type Golf Club Head, based on a Japanese Patent Application originally filed in 1983. The Tomita Patent discloses a durable golf club head having an outer shell composed of a fiber reinforced plastic material, a foam center core, and an intermediate shell formed of a thermoplastic resin material. Yet another disclosure is U.S. Pat. No. 4,630,826 to Nishigaki et al., for Golf Club Head. The Nishigaki Patent discloses body composed of a carbon resin layer and a cast resin layer with a face insert block composed of a ceramic material. Still another disclosure is U.S. Pat. No. 4,778,185 to Kurokawa, for Wood-Type Core-Shell Golf Club Heads, based on Japanese Patent Application originally filed in 1984. The Kurokawa Patent discloses a golf club head composed of a foam core and a shell composed of a material fiber reinforced plastic having long and short fibers. Yet another disclosure is U.S. Pat. No. 4,793,616 to Fernandez, for Golf Club. The Fernandez Patent discloses a club head shell composed resin impregnated fibers and ceramic particles within the resin to provide. a high strength shell. Yet another disclosure is U.S. Pat. No. 5,154,425 to Niskanen et al., for a Composite Golf Club Head. The Niskanen Patent discloses a club head composed of a metal matrix composite of a ceramic matrix composite. Although the prior art has disclosed many club head composed of composite materials, the prior art has failed to provide a golf club head composed of a composite material that addresses the durability of the face.

SUMMARY OF INVENTION

The present invention provides a golf club head that is composed of a composite material and has a textured coating on its striking plate for better durability.

One aspect of the present invention is a composite golf club head having a body composed of a plurality of pre-preg plies having fibers. The body has a sole, a crown, a ribbon and a striking plate portion defining a hollow interior. The striking plate portion has a thickness in the range of 0.010 inch to 0.250 inch. A textured coating is applied to the striking plate portion. The texture coating includes a plurality of polymer resin particles, a medium and a coupling agent. The plurality of polymer resin particles are present in an amount ranging from 5% to 30% of the volume of the texture coating. The textured coating has a thickness of 0.0005 inch to 0.003 inch.

Having briefly described the present invention, the above and further objects, features and advantages thereof will be recognized by those skilled in the pertinent art from the following detailed description of the invention when taken in conjunction with the accompanying drawings.

BRIEF DESCRIPTION OF DRAWINGS

FIG. 1 is an exploded view of a golf club head of the present invention.

FIG. 2 is a front view of a golf club head of the present invention.

FIG. 2B is a perspective view of a golf club of the present invention.

FIG. 8 is a cross-sectional view of the golf club head of FIG. 2 along line 8—8.

FIG. 9 is an isolated cross-sectional view of a face preform of a golf club head of the present invention.

FIG. 9A is an enlarged view of area A of FIG. 9.

FIG. 9B is an enlarged view of area B of FIG. 9.

DETAILED DESCRIPTION

Figure 2A:
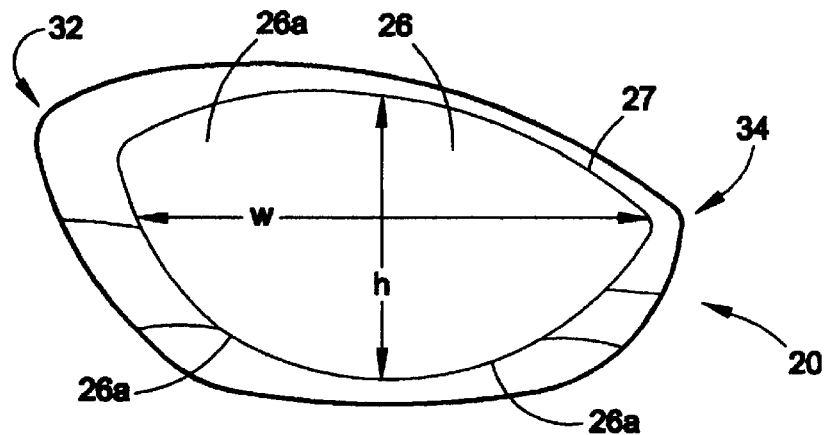
FIG. 2A is a front view of a golf club head of the present invention.
Figure 3:
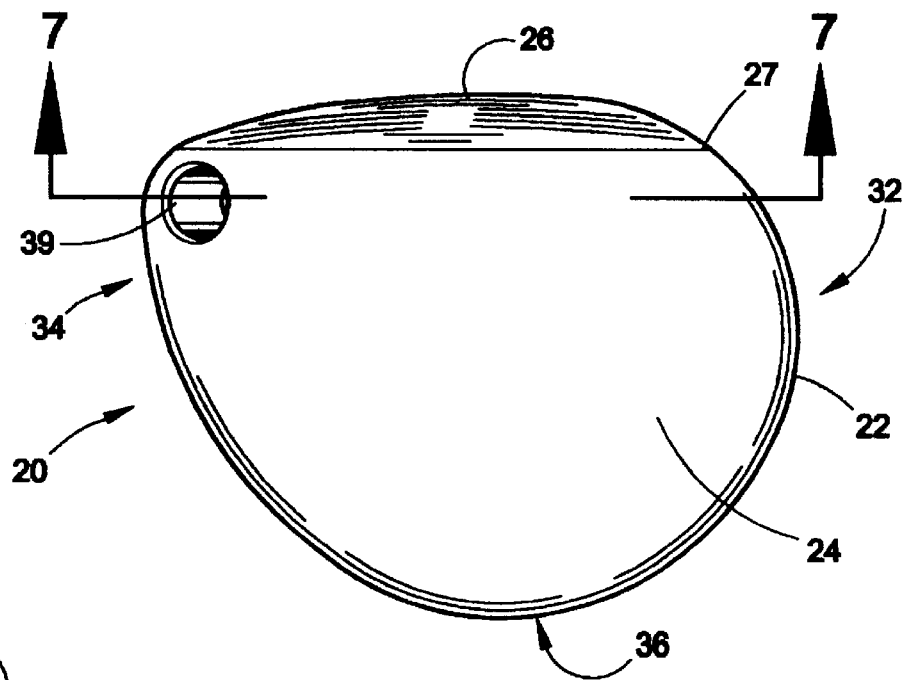
FIG. 3 is a top plan view of a golf club head of the present invention.
Figure 4:
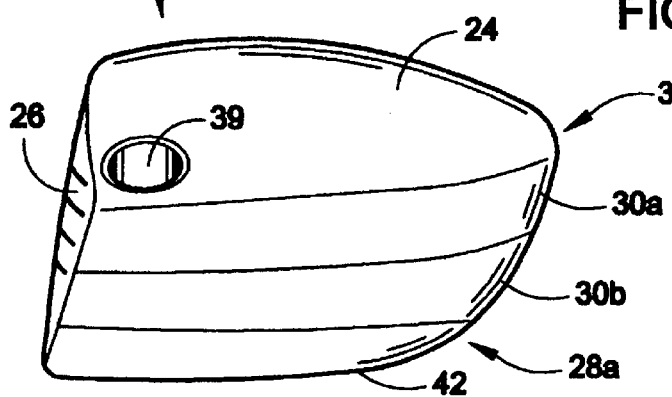
FIG. 4 is a heel end view of a golf club head of the present invention.
Figure 5:
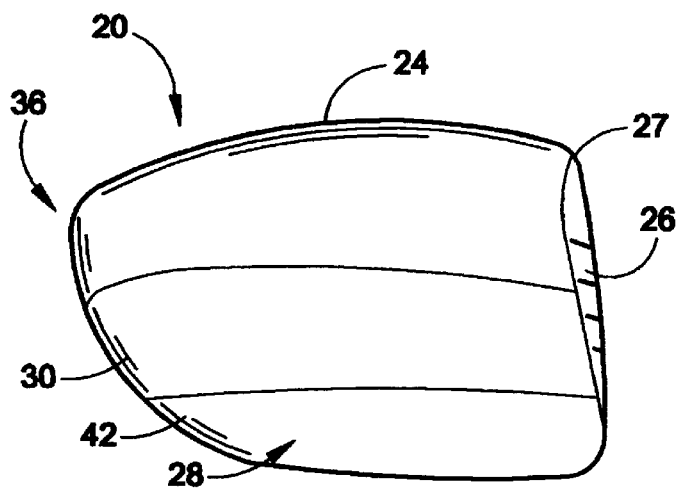
FIG. 5 is a toe end view of a golf club head of the present invention
Figure 6:
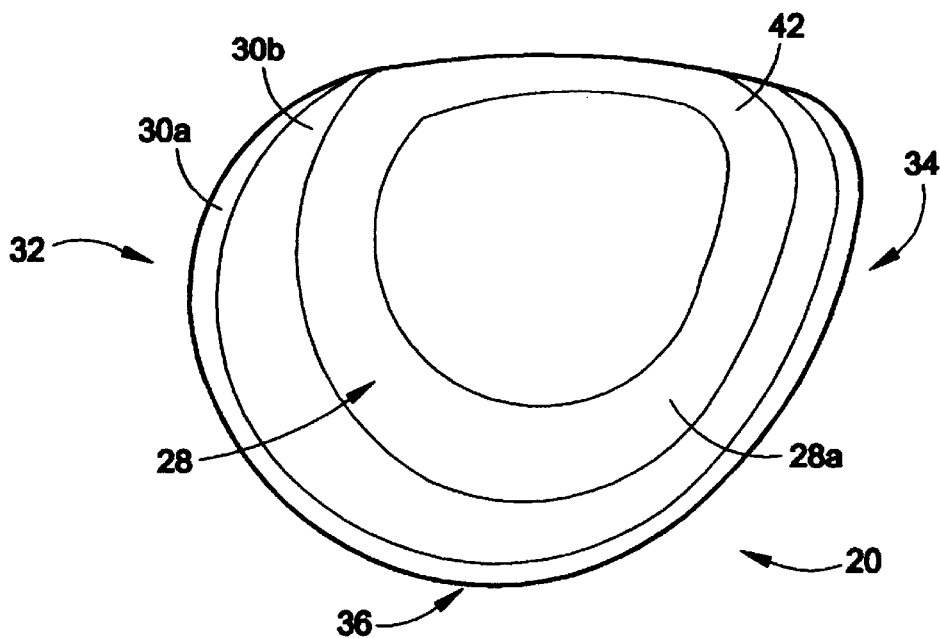
FIG. 6 is a bottom plan view of a golf club head of the present invention.

As shown in FIGS. 1–6, a golf club head of the present invention is generally designated 20. The club head 20 is either a fairway wood or a driver. The drivers range in loft angle of from six degrees to fifteen degrees. The club head 20 has a body 22 that is generally composed of a composite material such as plies of carbon pre-preg sheets. The body 22 has a crown 24, a striking plate 26, a sole 28 with a bottom portion 28a and a ribbon 30. The ribbon preferably has an upper ribbon wall 30a and a lower ribbon wall 30b. The ribbon 30 generally extends from a toe end 32 to a heel end 34. The ribbon 30 generally begins at one end of the striking plate 26 and ends at an opposite end of the striking plate 26. A rear 36 of the body 22 is opposite the striking plate 26 and is defined by portions of the ribbon 30, the crown 24 and the sole 28. Also, at the heel end 34 of the club head 20 is an internal tube 38 with an opening 39 for placement of a shaft therein. The internal tube 38 is placed within the hollow interior 44 of the body 22. Within the ribbon is a weight member 40.

A sole plate 42 is disposed within a recess 29 of the bottom portion 28a of the sole 28. The sole plate 42 is preferably composed of a metal material such as aluminum or titanium, and preferably has a mass of 5 grams to 20 grams. A preferred mass for an aluminum sole plate 42 is approximately 11 grams, and a preferred mass for a titanium sole plate 42 is approximately 18 grams. The sole plate 42 is preferably bonded within the recess 29 through use of adhesives. The sole plate 42 preferably has embossed graphics thereon. The sole plate 42 increases the durability of the club head 20 since the sole 28 often impacts the ground during the striking of a golf ball.

The club head 20 of the present invention also has a greater volume than a composite club head of the prior art while maintaining a weight that is substantially lower or equivalent to that of the prior art. The volume of the club head 20 of the present invention ranges from 175 cubic centimeters to 450 cubic centimeters, more preferably ranges from 300 cubic centimeters to 400 cubic centimeters, and is most preferably 360 cubic centimeters for a driver. The mass of the club head 20 of the present invention ranges from 165 grams to 300 grams, preferably ranges from 175 grams to 225 grams, and most preferably from 188 grams to 195 grams. The body 22 of plies of pre-preg material has a mass ranging from 80 grams to 120 grams, and most preferably 98 grams.

The volume of the present invention is increased by increasing the vertical distance of the club head 20 from the sole 28 to the crown 24, as opposed to the horizontal distance of the heel end 34 to the toe end 32. This increase in volume is brought about by the dual wall structure of the ribbon 30. The upper ribbon wall 30a is approximately perpendicular relative to the crown 24, while the lower ribbon wall 30b preferably has angle between 25 degrees to 75 degrees relative to the crown 24. The greater volume of the club head 20 allows the club head 20 to be more forgiving than prior art golf club heads while providing better performance. The mass of club head 20 is much lower than metal club heads of similar volumes, and thus the large volume does not deter from the swing of a golfer.

The striking plate 26 has a smaller aspect ratio than striking plate plates of the prior art. The aspect ratio as used herein is defined as the width, w, of the striking plate divided by the height, h, of the striking plate 26, as shown in FIG. 2A. In one embodiment, the width w is 90 millimeters and the height h is 54 millimeters giving an aspect ratio of 1.666. In conventional golf club heads, the aspect ratio is usually much greater than 1. For example, the original GREAT BIG BERTHA® driver had an aspect ratio of 1.9. The aspect ratio of the present invention preferably ranges from 1.0 to 1.7.

Figure 7:
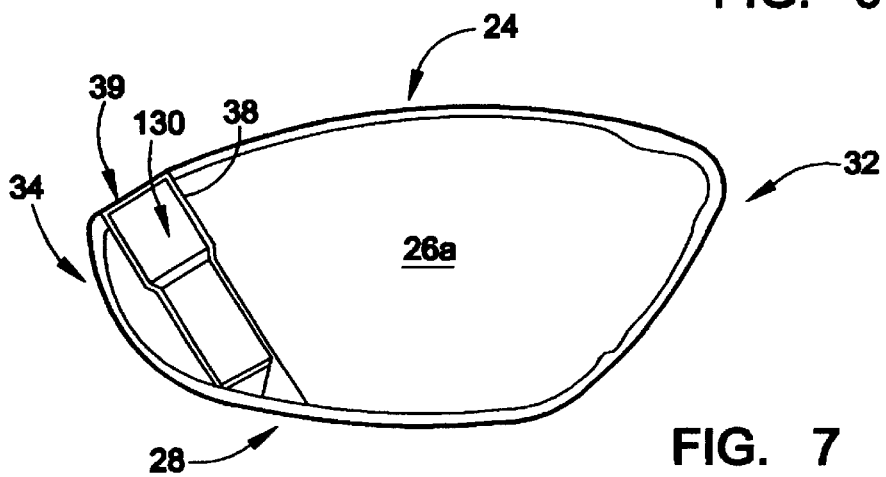
FIG. 7 is a cross-sectional view of the golf club head of FIG. 3 along line 7—7.

As shown in FIG. 7, the internal tube 38 lies within the hollow interior 44 of the club head 20. The internal tube is preferably composed of a metal material and has a mass ranging from 8 grams to 20 grams. The internal tube 38 is most preferably composed of stainless steel and has a mass of approximately 14 grams. The internal tubing 38 has a bore 130 to receive an insert and a shaft, not shown, therein. Such an insert is discussed in U.S. Pat. No. 6,352,482, filed on Aug. 31, 2000, for a golf Club With Hosel Liner, which is hereby incorporated by reference in its entirety. Preferably, the club head 20 has a hollow interior 44 defined by the body 22, however, the light weight of the composite body 22 allows for numerous manipulations in placement of weight, foam, sound enhancing devices and the like within the hollow interior 44.

Referring specifically to FIG. 1, the club head 20 has a weight member 40 disposed within the plies of pre-preg that compose the ribbon 30 of the club head 20.

Preferably, the weight member 40 is composed of three weight members 40a, 40b and 40c. One such weight member 40 is described in co-pending U.S. patent application Ser. No, 09/474,688, filed on Dec. 29, 1999, and entitled A Composite Golf Club Head With An Integral Weight Strip, which is hereby incorporated by reference in its entirety. Another such method is described in co-pending U.S. patent application Ser. No. 09/947,292, for Internal Weighting For A Composite Golf Club Head, filed on Sep. 5, 2001, and hereby incorporated by reference in its entirety. The weight member 40 has a mass ranging from 30 grams to 80 grams, more preferably 45 grams to 70 grams, and most preferably 54 grams. The weight member 40 is preferably composed of a metal material integrated into a polymer medium. The metal material is preferably selected from copper, tungsten, steel, aluminum, tin, silver, gold, platinum, or the like. A preferred metal is tungsten . The weight member 40 has a density greater than the composite material of the body 22. Preferably, the weight member 40 extends from approximately the heel end 34 of the striking plate 26 through the rear 36 to the toe end 32 of the striking plate 26. However, the weight member 40 may only extend along the rear 36 of the ribbon 30, the heel end 34 of the ribbon 30, the toe end 32 of the ribbon 30, or any combination thereof. Those skilled in the pertinent art will recognize that other weighting materials may be utilized without departing from the scope and spirit of the present invention.

The placement of the weighting members 40a–c allows for the moment of inertia of the golf club head 20 to be optimized. A more thorough description of the optimization of the moments of inertia is disclosed in co-pending U.S. patent application Ser. No. 09/796,951, filed on Feb. 27, 2001, entitled High Moment of Inertia Composite Golf Club, and hereby incorporated by reference in its entirety. In one preferred example of the golf club head 20 of the present invention, the moment of inertia about the lxx axis through the center of gravity is approximately 2566 grams-centimeters squared (g-cm$^2$), the moment of inertia about the lyy axis through the center of gravity is approximately 1895 g-cm$^2$, and the moment of inertia about the lzz axis through the center of gravity is approximately 3368 g-cm$^2$.

As shown in FIGS. 8, 9, 9A and 9B, a return portion 100 is a transition area from a perimeter 29 of the striking plate 26 rearward towards the crown 24. The return portion 100 has a thickness ranging from 0.100 inch to 0.200 inch to control the compliance of the striking plate 26. The return portion 100 has an upper section 100a, a lower section 100b, a heel section 100c, not shown, and a toe section 100d, not shown. The return portion 100 also has a taper region 101, which includes an upper tapering region 101a, a lower tapering region 101b, a heel tapering region 101c, not shown, and a toe tapering region 101d, not shown. The tapering region 101 tapers in thickness from a greater thickness nearer the striking plate portion 26 to a lesser thickness rearward toward the crown 24.

The return portion 100 has a predetermined length which extends rearward from the perimeter 29 of the striking plate portion 26 into the crown 24. Preferably, the distance of the return portion 100, Dr, ranges from 0.25 inch to 2.0 inches, more preferably from 0.5 inch to 1.75 inches, and most preferably 1.5 inches. Preferably, the distance from the perimeter 29 to the beginning of the tapering region 101 of the return portion 100 ranges from 0.25 inch to 1.5 inches, and most preferably 1.0 inch.

Figure 10:
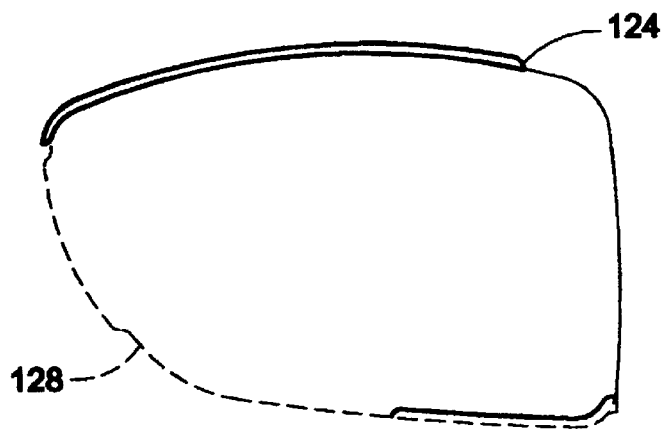
FIG. 10 is an isolated cross-section view of a crown/face preform of a golf club head of the present invention.
Figure 11:
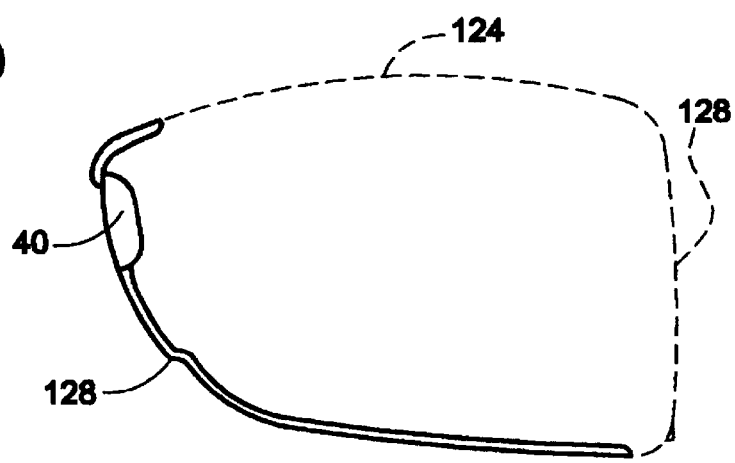
FIG. 11 is an isolated cross-section view of a sole preform of a golf club head of the present invention.
Figure 12:
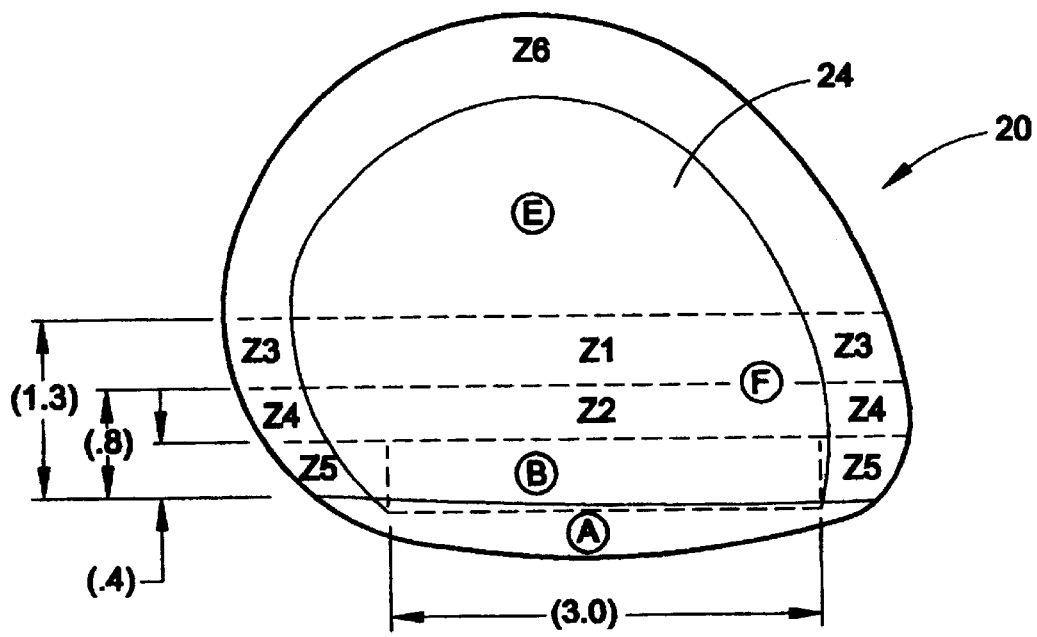
FIG. 12 is a top plan view of a golf club head of the present invention illustrating the variation in thickness of the walls of the golf club head.
Figure 13:
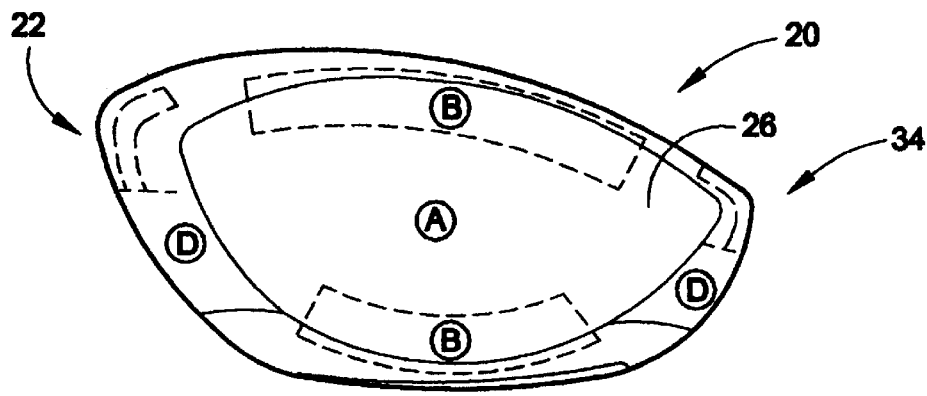
FIG. 13 is a front plan view of a golf club bead of the present invention illustrating the variation in thickness of the walls of the golf club head.
Figure 14:
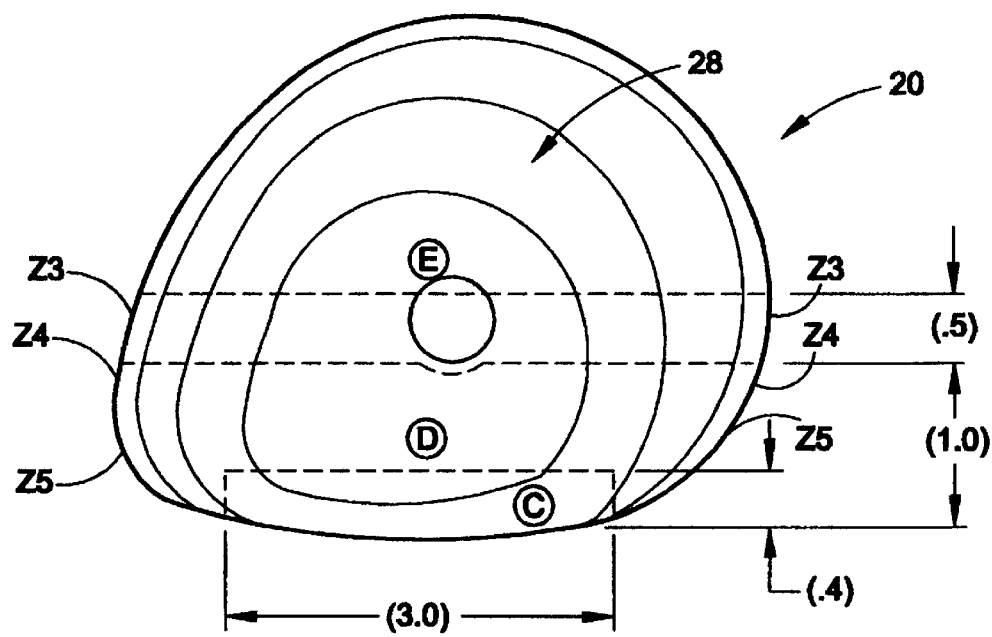
FIG. 14 is a bottom plan view of a golf club head of the present invention illustrating the variation in thickness of the walls of the golf club head.
Figure 15:
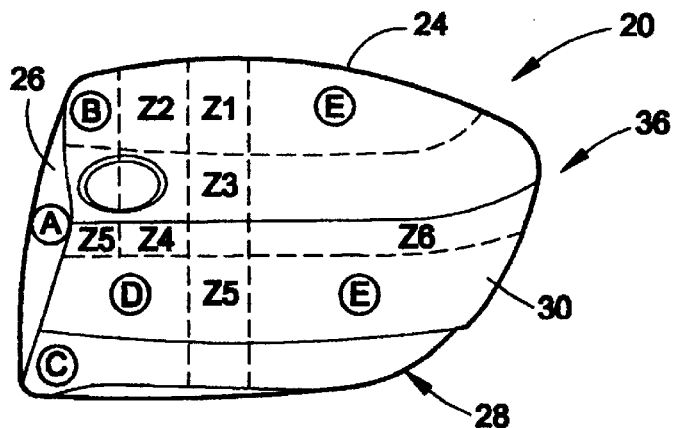
FIG. 15 is a heel end view of a golf club head of the present invention illustrating the variation in thickness of the walls of the golf club head.

The body 22 is manufactured from a face component 125, which includes the striking plate portion 26 and the return portion 100, a crown component 124 and a sole component 128. The crown component 124 overlaps the face component 125, as shown in FIG. 10. The sole component 128 includes the ribbon portion 30 and the bottom portion 28a. The sole component 128 is attached to the crown component 124 and the face component 125.

Figure 16:
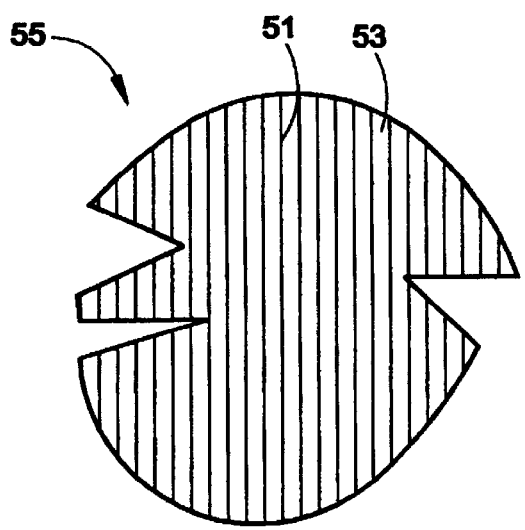
FIG. 16 is a plan view of a face/crown ply having a ninety-degree orientation.

FIGS. 16–19 illustrate preferred pre-preg sheets for forming the composite body of the golf club head 20. FIG. 16 illustrates a face/crown ply pre-preg sheet that is generally designated 55. The face/crown ply 55 has a plurality of fibers 51 dispersed within a resin body 53. The fibers 51 are preferably composed of a carbon material. Alternatively, the fibers 51 may be aramid fibers, glass fibers or the like. The resin is typically an epoxy material. The relation of the fibers 51 to the striking plate 26, when the striking plate 26 is in a position to strike a golf ball, determines the orientation of the fibers 51. If the fibers 51 are parallel with the ground, or in other words extending across from the toe end to the heel end, then the face/crown ply 55 has a zero degree orientation. If the fibers 51 are approximately perpendicular to the ground, as shown in FIG. 16, or in other words extending from the crown to the sole, then the face/crown ply 55 has a ninety degrees orientation.

Figure 17:
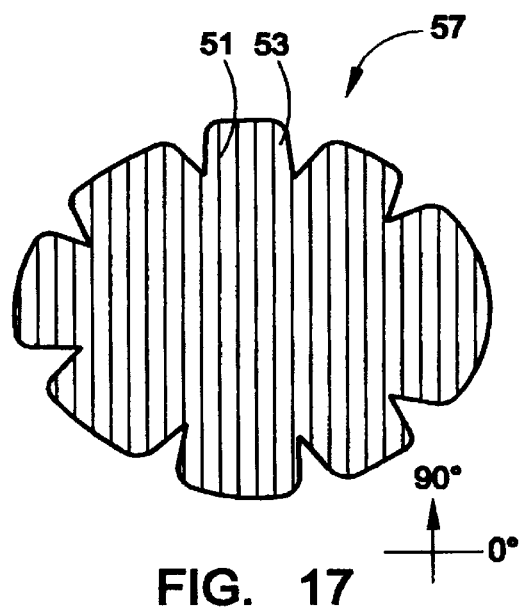
FIG. 17 is a plan view of a full face ply having a ninety degree orientation.

FIG. 17 illustrates a full face ply pre-preg sheet that is generally designated 57. As with the face/crown ply 55, the full face ply 57 has a plurality of fibers 51 dispersed within a resin body 53. The fibers 51 extend from the sole 28 to the crown 24, and thus the full face ply 57 has fibers 51 that are perpendicular to the ground when it is in a position for striking a golf ball. Therefore, the full face ply 57 of FIG. 17 has a ninety degrees orientation.

Figure 18:
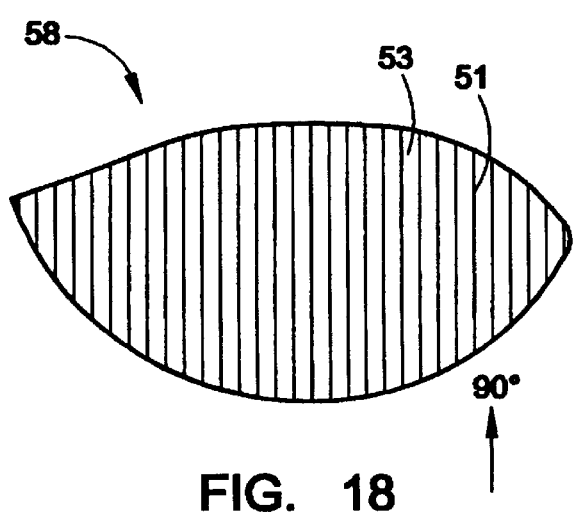
FIG. 18 is a plan view of a face doubler ply having a ninety degree orientation.

FIG. 18 illustrates a face doubler ply pre-preg sheet that is generally designated 58. As with the face/crown ply 55, the face doubler ply 58 has a plurality of fibers 51 dispersed within a resin body 53. The fibers 51 extend from the sole 28 to the crown 24, and thus the face doubler ply 58 has fibers 51 that are perpendicular to the ground when it is in a position for striking a golf ball. Therefore, the face doubler ply 58 of FIG. 18 has a ninety degrees orientation.

Figure 19:
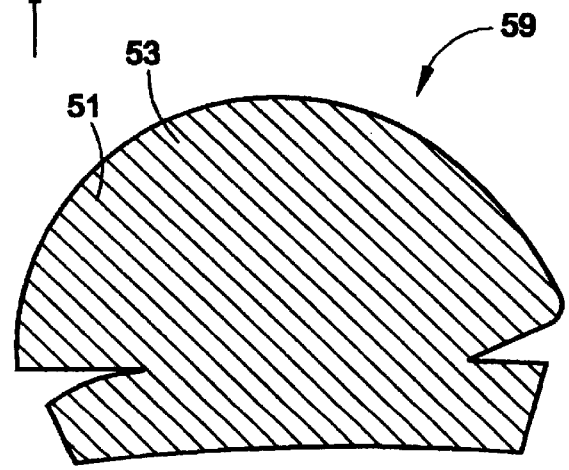
FIG. 19 is a plan view of a sole ply having a negative forty-five degree orientation.

FIG. 19 illustrates a sole ply pre-preg sheet that is generally designated 59. As with the face/crown ply 55, the sole ply 59 has a plurality of fibers 51 dispersed within a resin body 53. The fibers 51 extend at a forty-five degree angle relative to the ground when it is in a position for striking a golf ball. Therefore, the sole ply 59 of FIG. 19 has a forty-five degree orientation.

As previously stated, the preferred composite material is plies of carbon pre-peg sheets. Plies of pre-preg composite sheets are manufactured by pulling strands of fiber in a parallel motion, preferably carbon, aramid or glass fiber, through a resin film and allowing the resin to partially cure or 'stage'. When the resin is partially staged, the resin holds the fibers together such that the fibers form a malleable sheet with all of the fibers in a specific orientation relative to an edge of the sheet. Preferred orientations are zero degrees, plus forty-five degrees, minus forty-five degrees and ninety degrees. Exemplary carbon pre-preg fiber sheets may be obtained from Newport Composites of Santa Ana, Calif., Fiberite Inc. of Green Tex., or Hexcel Inc. of Pleasonton, Calif.

The manipulation of the thickness of the various regions of the body 22 allows the golf club head 22 to have superior durability, forgiveness and performance as compared to prior art composite golf club heads. As shown in FIGS. 12–15, the thickness of the body 22 is focused on the striking plate portion 26. In a most preferred example: the region designated A of the striking plate portion 26 has a thickness of approximately 0.169 inch; the region designated B, at the junction of the crown 24 and striking plate 26 has a thickness of approximately 0.188 inch; the region designated C of the bottom portion 28a of the sole 28 has a thickness of approximately 0.221 inch; the region designated D of the ribbon 30 and of the bottom portion 28a has a thickness of approximately 0.202 inch; the region designated E of the crown 24, the bottom portion 28a and the ribbon 30 has a thickness of approximately 0.033 inch; and the region designated F of the crown 24 has a thickness of approximately 0.191 inch. The regions designated Z1, Z2, Z3, Z4, Z5 and Z6 are tapering zones where the thickness tapers rearward.

The golf club head 20 is preferably manufactured using a bladder molding process. One such process is described in U.S. Pat. No. 6,248,025, which is hereby incorporated by reference. However, those skilled in the pertinent art will recognize that other manufacturing methods may be utilized without departing from the scope and spirit of the present invention.

The coefficient of restitution of the club head 20 of the present invention under standard USGA test conditions with a given ball ranges from 0.8 to 0.9, preferably ranges from 0.81 to 0.87 and is most preferably 0.82. The coefficient of restitution (also referred to herein as COR) is determined by the following equation:

$$e = v_2 v_1 U_1 U_2$$

wherein $U_1$ is the club head velocity prior to impact; $U_2$ is the golf ball velocity prior to impact which is zero; $v_1$ is the club head velocity just after separation of the golf ball from the striking plate of the club head; $v_2$ is the golf ball velocity just after separation of the golf ball from the striking plate of the club head; and e is the coefficient of restitution between the golf ball and the club striking plate.

The values of e are limited between zero and 1.0 for systems with no energy addition. The coefficient of restitution, e, for a material such as a soft clay or putty would be near zero, while for a perfectly elastic material, where no energy is lost as a result of deformation, the value of [0085] would be 1.0. The thickness of the striking plate 26 and the orientation of the plies of pre-preg determine the coefficient of restitution of the golf club head 20. Additionally, the thickness of the return 100 of the golf club head 20 allows for a greater deflection in the striking plate 26 which increases the coefficient of restitution of the golf club head 20. The return 100 couples the striking plate 26 to the crown 24 which reduces the loss of energy to the striking plate 26 during impact with a golf ball. If the return 100 is too thick, the striking plate 26 is isolated and rigid, thereby reducing the coefficient of restitution. If the return 100 is too thin, failure of the striking plate 26 may occur upon impact with a golf ball.

Figure 20A:
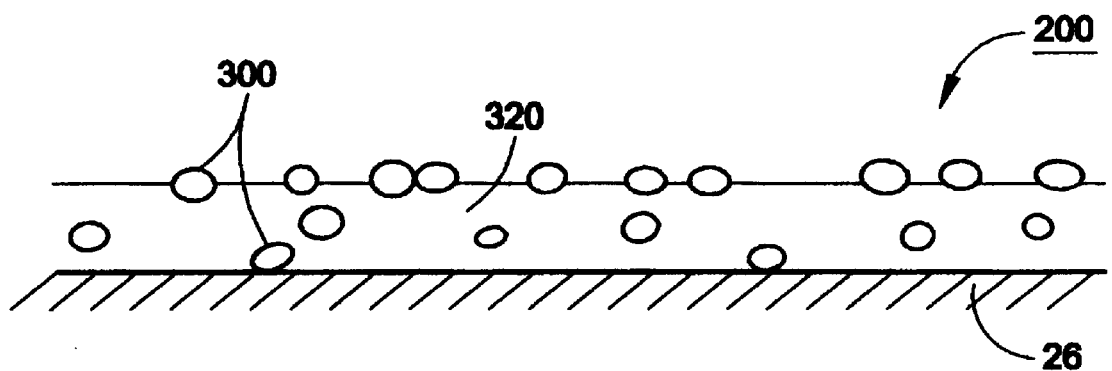
FIG. 20A is a cross-sectional view of the striking plate portion of the golf club head illustrating an embodiment of the texture coating of the present invention, comprising resin particles within a medium.
Figure 20B:
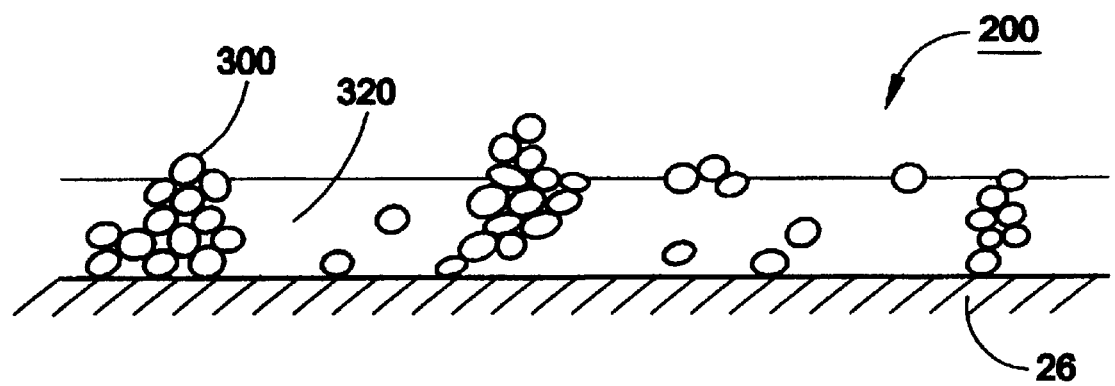
FIG. 20B is an alternative embodiment of FIG. 20A, showing agglomerated resin particles within the medium of the present invention.
Figure 20C:
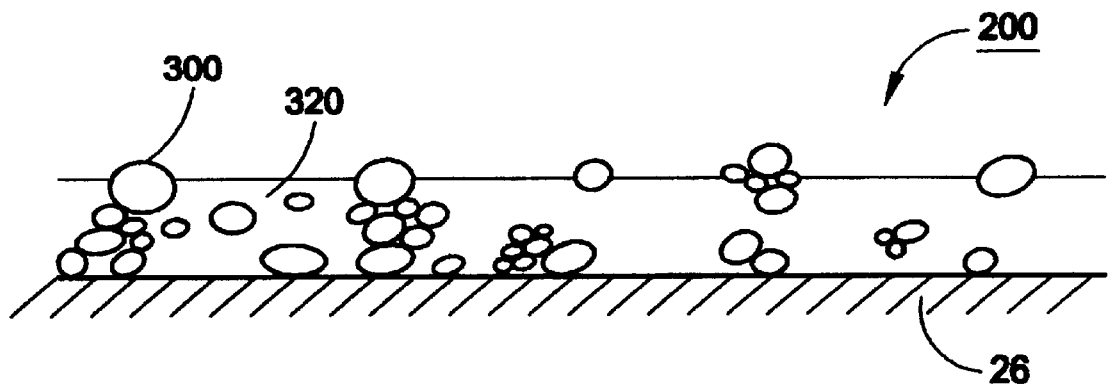
FIG. 20C is yet another alternative embodiment of FIG. 20A, showing agglomerated dissimilar size resin particles within the medium of the present invention.

FIGS. 20A–C represent various embodiments of the texture coating 200 of the striking plate 26. The texture coating 20 comprises a number of resin particles 300, a medium 320 and a coupling agent (not shown). The resin particles 300 can be thermosetting or thermoplastic resins, and in a preferred embodiment selected from polyethylene, polypropylene, olefins, fluoropolymers, polyamides and polyamines. In a preferred embodiment, the resin particles 300 are composed of a thermoplastic crystalline polyolefin, most preferably the polyolefin is a polyethylene material or polypropylene material such as produced by Shamrock Corporation. Preferably, the each of the plurality of resin particles 300 have a specific gravity ranging from 0.90 grams per cubic centimeter (g/cc) to 0.97 g/cc, and most preferably 0.93 g/cc. The plurality of resin particles 300 are dispersed in the medium 320 preferably under high speed mixing.

Each of the plurality of resin particles 300 preferably have a high viscosity which is useful for air drying or baking systems, up to temperatures of 500° F., without losing their particle definition.

Although pictorially represented as spherical, the resin particles 300 can be selected from several shapes with smooth surfaces preferred to assist in uniform distribution throughout the medium 320. Each of the resin particles 300 has a size of preferably ranging from 10 microns to 240 microns, more preferably from 10 to 30 microns, even more preferably from 15 microns to 25 microns, and most preferably 18 microns.

Any numbers of conventional methods can be used to apply the texture coating 200, such as brushing, spraying, electrostatic methods, powder coating and two component systems. A preferred method is spraying the texture coating onto the striking plate 26 subsequent to all other finishing procedures. The golf club head 20 is covered, only exposing the striking plate 26. In a preferred embodiment, the texture coating 200 is applied within line 26A, as shown in FIG. 2A, and thus only the striking plate portion 26 is coated with the texture coating 200. In a preferred embodiment, the texture coating 200 is applied over the scorelines of the striking plate portion 26.

The texture coating 200 is preferably applied uniformly to a thickness of 0.0005 inch to 0.003 inch, more preferably 0.0009 inch to 0.002 inch, and most preferably 0.001 inch to 0.0015 inch.

Characteristics of medium 320 include an ability to mix with the resin particles 300 and bond to structural material of the striking plate 26, followed by drying to a solid coating. Suitable material choices for the medium 320 include aqueous or organic solutions or suspensions, liquid adhesives, clear coats and paints. In a preferred embodiment, the medium 320 comprises a two component acrylic polyurethane clear coat capable of binding the resin particles 300 and adhering to the surface of the striking plate 26. Such a coating is sold by Magna, as acrylic urethane #490C0117. The resin particles 300 form up to 20% by volume of the texture coating 200. In a most preferred embodiment, the resin particles 300 form 5% to 10% by volume of the texture coating 200. In an alternative embodiment, the medium 320 is methylsiloxane with silica nanoparticles such as PERMA NEW COATING from California Hardcoat. A texture coating 200 utilizing this methylsiloxane has a thickness ranging from 3 to 12 microns.

The coupling agent serves to alter th[0085] surface chemistry of the resin particles 300 and the medium 320, thus promoting improved bonding both within the texture coating 200, and to the surface of the striking plate 26. Preferred embodiments of the coupling agent include silanes and inorganic acids such as phosphoric acid, with a most preferred embodiment being Silane 187A from Shell Chemical Co.

The texture coating 200 preferably has a satin gloss, however, alternatively the texture coating may have a matte gloss. The texture coating 200 provides greater durability, better scratch resistance and abrasion resistance for the striking plate 26 composed of a plurality of plies of pre-preg material. The texture coating 200 also has reduced cracking.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

We claim as our invention:

1. A composite golf club head comprising:
   a face component composed of a plurality of pre-preg plies having fibers, the plurality of pre-preg plies ranging from 20 to 70 plies, the face component having a striking plate portion and a return portion, the striking plate portion having a thickness in the range of 0.0010 inch to 0.250 inch, and the return portion tapering in thickness rearward from a perimeter of the striking plate portion;
   a crown composed of a plurality of pre-preg plies ranging from 3 to 20 plies, the crown attached to the face component;
   a sole composed of a plurality of pre-preg plies ranging from 3 to 20 plies, the sole having a ribbon portion and a bottom portion, the bottom portion of the sole attached to the return portion of the face component and the ribbon portion of the sole attached to the crown;
   a weighting member disposed within the plies of pre-preg of the ribbon portion of the sole; and
   a textured coating applied to the striking plate portion, the texture coating comprised of a plurality of polymer resin particles composed of a polyethylene material, a medium and a coupling agent, the plurality of polymer resin particles present in an amount ranging from 5% to 30% of the volume of the texture coating, the textured coating having a thickness of 0.0005 inch to 0.003 inch.

2. The golf club head according to claim 1 wherein the textured coating has a thickness in the range of 0.001 inch to 0.0015 inch.

3. The golf club head according to claim 1 wherein the plurality of resin particles of the textured coating are composed of a polyethylene material.

4. The golf club head according to claim 1 wherein the medium is a clear coat.

5. The golf club head according to claim 1 wherein the medium is a methylsiloxane with silica nanoparticles.

6. The golf club head according to claim 1 wherein the coupling agent is a silane material.

7. A golf club comprising
   a golf club head having a volume of 350 cubic centimeters to 400 cubic centimeters, the golf club head composed of a plurality of plies of pre-preg, the golf club head having a striking plate portion with a textured coating thereon, the textured coating comprised of a plurality of polymer resin particles composed of a polyethylene material, a medium and a coupling agent, the plurality of polymer resin particles present in an amount ranging from 5% to 30% of the volume of the texture coating, the textured coating having a thickness of 0.0005 inch to 0.003 inch;
   a shaft having a tip end and a butt end, the shaft composed of a graphite material and the tip end of the shaft attached to the golf club head; and
   a grip placed over a butt end of the shaft;
   wherein the golf club has a mass less than 290 grams, and the golf club head has a coefficient of restitution ranging from 0.80 to 0.93 under standard USGA conditions.

8. A composite golf club head comprising:
   a face component composed of a plurality of pre-preg plies ranging from 20 to 70 plies, the face component having a striking plate portion and a return portion extending laterally rearward from a perimeter of the striking plate, the striking plate portion having a thickness in the range of 0.010 inch to 0.250 inch;
   a crown composed of a plurality of pre-preg plies ranging from 3 to 20 plies, the crown attached to the face component and overlapping an upper section of the return portion, the upper section of the return portion extending rearward from the perimeter of the striking plate portion a distance of at least 0.5 inch;
   a sole component composed of a plurality of pre-preg plies ranging from 3 to 20 plies, the sole component having a ribbon portion and a bottom portion, the bottom portion of the sole component attached to a lower section of the return portion of the face component and the ribbon portion of the sole component attached to the crown component, the lower section of the return portion extending rearward from the perimeter of the striking plate portion a distance of at least 0.5 inch;
   a texture coating on the striking plate portion, the texture coating consisting of a plurality of polymer resin particles, composed of a polyethylene material, with diameters ranging from 18 microns to 50 microns, a silane coupling agent and a clear coat, wherein the plurality of resin particles ranges from 5% to 10% of the volume of the texture coating, the silane coupling agent ranges 0.01% to 2% of the volume of the texture coating, and the clear coat is at least 88% of the volume of the texture coating.

9. A composite golf club head comprising:
   a body composed of a plurality of pre-preg plies having fibers, the body having a sole, a crown, a ribbon and a striking plate portion defining a hollow interior, the striking plate portion having a thickness in the range of 0.010 inch to 0.250 inch; and
   a textured coating applied to the striking plate portion, the texture coating comprised of a plurality of polymer resin particles, composed of a polyethylene material, a medium and a coupling agent, the plurality of polymer resin particles present in an amount ranging from 5% to 30% of the volume of the texture coating, the textured coating having a thickness of 0.0005 inch to 0.003 inch.

10. The golf club head according to claim 1 wherein the textured coating has a thickness in the range of 0.001 inch to 0.0015 inch.

\* \* \* \* \*